April 2, 1968     J. VAN DER WAL     3,375,662

REVERSIBLE FLUID COUPLING DEVICE

Filed May 2, 1966                        2 Sheets-Sheet 1

INVENTOR.
JURJEN VAN DER WAL
BY
ATTORNEY

April 2, 1968   J. VAN DER WAL   3,375,662
REVERSIBLE FLUID COUPLING DEVICE
Filed May 2, 1966   2 Sheets-Sheet 2
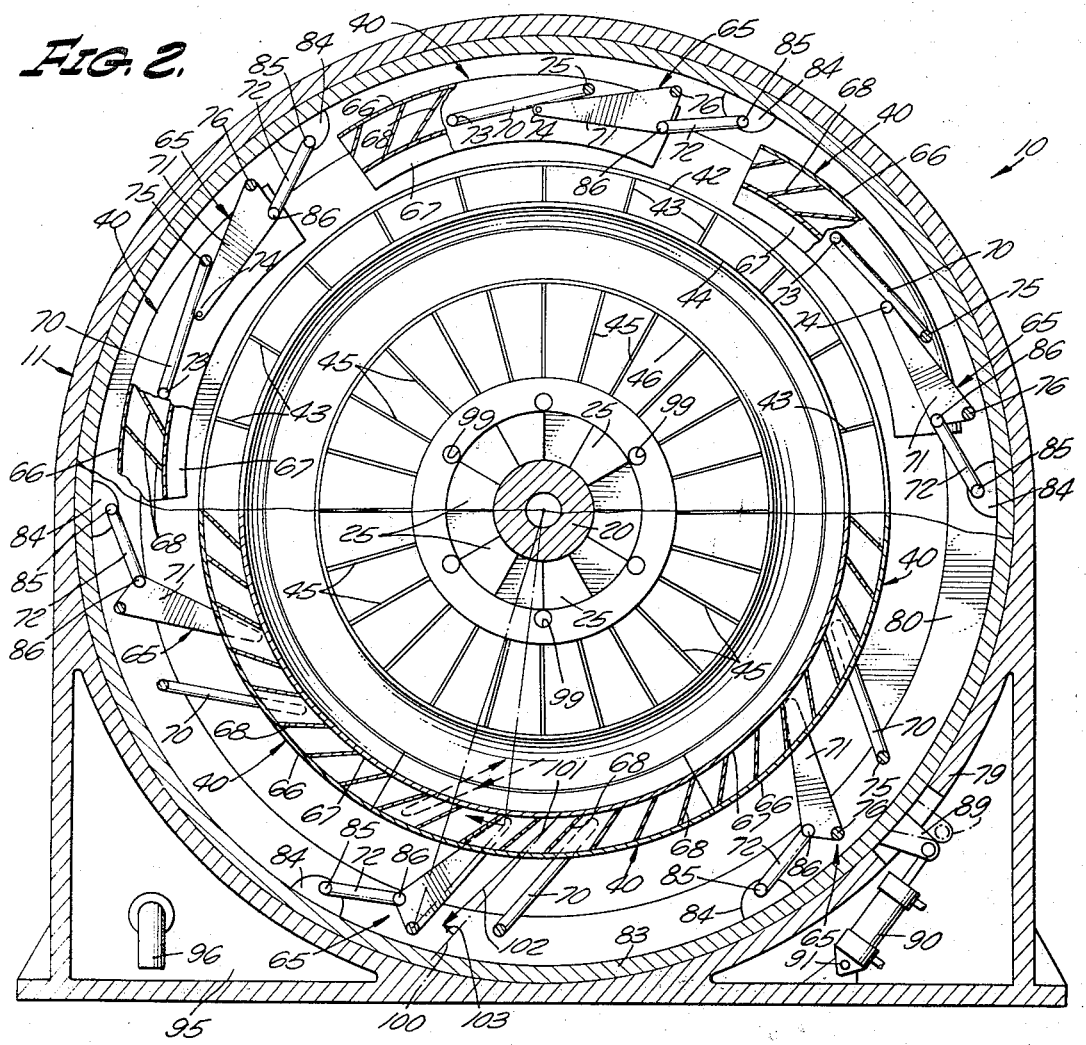
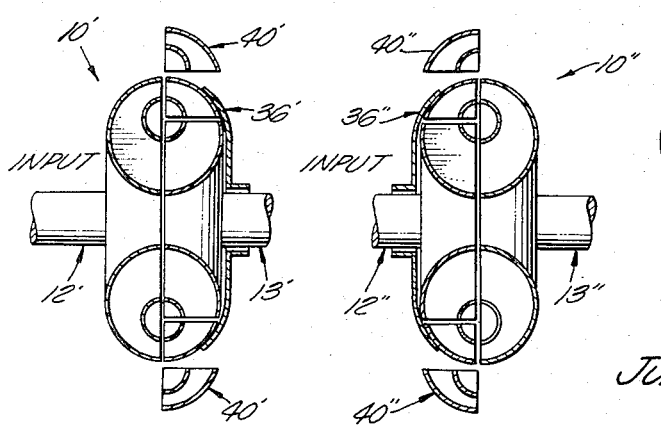
INVENTOR.
JURJEN VAN DER WAL
BY
ATTORNEY

# United States Patent Office 3,375,662
Patented Apr. 2, 1968

3,375,662
REVERSIBLE FLUID COUPLING DEVICE
Jurjen van der Wal, 12722 Colima Road,
La Mirada, Calif. 90638
Filed May 2, 1966, Ser. No. 546,953
19 Claims. (Cl. 60—54)

ABSTRACT OF THE DISCLOSURE

A fluid coupling operable to drive a driven shaft selectively in either direction from a uni-directional prime mover depending upon which of two readily exchangeable sets of vanes are in operating position relative to the periphery of the two principal components of the coupling assembly. No braking means is required when reversing the direction of the driven shaft. The fluid coupling also includes a positive-drive mechanical coupling and this is safely engaged while the fluid coupling is operating under load by abruptly decreasing the speed of the prime mover briefly until the mechanical coupling is fully engaged.

---

This invention relates to fluid coupling devices for transmitting rotary power and more particularly to an improved brakeless, gearless, fluid coupling requiring a minimum of power to actuate the reversing facilities thereof and capable of handling power-transmission loads of the highest values with ease and reversible in a fraction of the time required for previously proposed reversible power transmission devices.

There are many prime mover applications wherein it is of paramount importance to provide for expeditious and efficient reversal of power output. A typical illustrative operating environment for the invention is in the drive train of marine propulsion equipment and customarily utilizing turbines as the prime mover. Power loads of 10,000 horsepower and upwards are customarily involved. Fluid coupling devices have many advantages for use in such propulsion systems but are subject to certain serious limitations and disadvantages. For example, as heretofore designed, an intolerable time loss is involved in converting these systems from one to the other direction of drive. Another serious disadvantage is the requirement in many of these prior couplings for friction brake means for absorbing the reaction forces during one of the two directions of operation and usually the reverse mode. As a practical matter it is not feasible to build braking systems capable of absorbing in excess of about 3,000 horsepower per fluid coupling whereas it is desirable in numerous operations to transmit several times this much power in reverse drive.

Another shortcoming of prior fluid coupling designs has been the inherent loss within the fluid coupling assembly of a small but nevertheless significant portion of the prime mover power. Heretofore, it has been generally accepted that such loss could not be avoided.

Accordingly, it is a primary object of the present invention to avoid the foregoing and other serious shortcomings of power tarnsmission trains and to provide a greatly simplified, more effective, more efficient, quickly reversible power train incorporating as one of its features the optional use of a direct mechanical drive under certain operating conditions. An exemplary embodiment of the invention comprises a compact main housing supporting aligned drive and driven shafts equipped between their adjacent ends with a single fluid coupling. This coupling includes a pair of annular portions supported for expeditious movement between the operative and inoperative positions relative to the impeller and turbine components of the fluid coupling so that one of the annular portions may be substituted for the other and with one of these portions being effective, when in operative position, to rotate the output shaft in the forward direction and the other being effective, when in operative position, to rotate the output shaft in the reverse direction. Each of these annular portions includes separate operating linkages arranged to operate without interference with one another while converting the coupling for operation in an opposite direction. One set of linkages operates on the toggle principle and requires relatively slight pressure to break the toggle and both of the selectively usable annular portions of the coupling are so constructed and arranged as to utilize the hydraulic fluid pressure within the coupling to lock them in operative position whenever in a rotating condition. The reversing power portion comprises a plurality of sectors cooperating when closed together to form a ring embracing the outer portions of the impeller and turbine.

A further and important feature of the invention fluid coupling assembly is the provision of an optionally-usable direct mechanical coupling between the adjacent ends of the two shafts including power means for engaging and disengaging this coupling under rotating conditions of the power train in a manner which will be explained presently to the end that the mechanical coupling may be substituted for the fluid coupling drive after the load has been brought up to speed. The direct mechanical drive is quickly and easily disengaged at any time and replaced by the fluid coupling drive whenever this becomes desirable, as for example, when desiring to shift to reverse drive.

Accordingly, it is a primary objective of the present invention to provide an improved highly flexible reversible power train capable of handling both small and large power outputs.

Another object of the invention is the provision of a brakeless, gearless, reversible fluid drive train having a minimum number of high efficiency components requiring a minimum of operating power to shift them between their respective operative and nonoperative positions under loaded operating conditions.

Another object of the invention is the provision of a power coupling device readily convertible between operation as a fluid coupling and as a direct mechanical coupling while the components are operating at or near a desired speed.

Another object of the invention is the provision of a simple lightweight, rugged and efficient fluid coupling having a pair of impeller portions easily and quickly substitutable one for another in operative relationship with the remainder of the fluid coupling structure and effective to convert the direction of the output drive from forward to reverse.

Another object of the invention is the provision of a reversible fluid coupling the impeller of which includes an outer annular portion formed of a plurality of sections each provided with supporting linkage means so arranged as to utilize the hydraulic fluid pressure within the coupling to hold the sectors firmly and positively in operating position and requiring a minimum amount of power to shift the sectors into nonoperative position when deactivating the reverse drive under load conditions.

Another object of the invention is the provision of a reversible fluid coupling having an annular portion of its impeller formed in two relatively movable sets and including linkage means for holding one of these sets selectively in its operative position and requiring a negligible amount of power to operate the linkage means to deactivate the coupling and permit the substitution of these sets one for the other to effect reversal of the direction of power drive.

These and other more specific objects will appear upon reading the following specification and claims and upon considering in connection therewith the attached drawing to which they relate.

Referring now to the drawing in which a preferred embodiment of the invention is illustrated.

FIGURE 2 is a cross-sectional view taken along line 2—2 on FIGURE 1;

FIGURE 4 is a cross-sectional view taken along line 4—4 on FIGURE 1; and

FIGURES 5 and 6 are schematic sectional views through two alternate arrangements of the fluid coupling.

Figure 1:
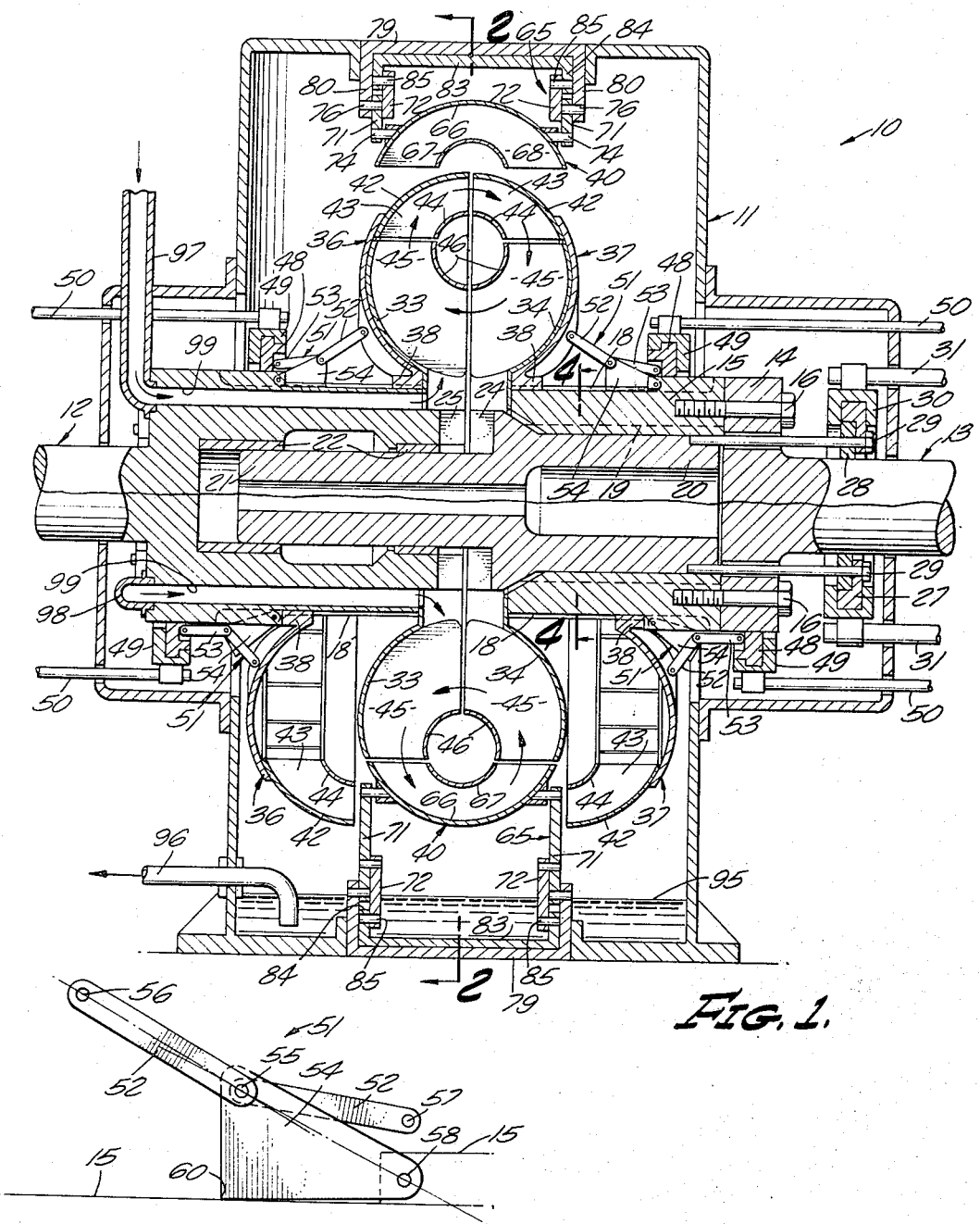
FIGURE 1 is a vertical sectional view through an exemplary embodiment of the invention coupling, the upper half of the view showing the parts positioned for forward drive and the lower half of the view showing the parts positioned for reverse drive.

Referring initially more particularly to FIGURE 1 there is shown one embodiment of a heavy duty coupling designated generally 10 for handling high power outputs. This coupling has a main housing 11 rotatably supporting in its opposite side walls a drive shaft 12 adapted to be connected to a prime mover, such as a single or multiple stage turbine, and a driven shaft 13 adapted to be connected to any load, not shown, such as a ship's propeller. The flanged end 14 of output shaft 13 is rigidly secured to a heavy duty sleeve or ring 15 by cap screws 16, this ring being provided on its exterior with axial splines 18 and on its interior with splines 19 and the details of which are best shown in FIGURE 4. Splines 19 mate with complementary splines formed on the exterior of a mechanical coupling member 20 having a cylindrical shank 21 journalled within bearings 22, 22 supported in a well opening through the end of drive shaft 12. The midportion of coupling member 20 is provided with a ring of radially disposed coupling bosses 24 complemental in shape with a similar ring of bosses 25 formed on the adjacent end of shaft 12. It will be understood that bosses 24, 25 are axially engageable with one another as coupling member 20 is shifted to the left from the disengaged position thereof shown in FIGURE 1 to provide a positive direct mechanical drive between shafts 12 and 13 with the result that both shafts rotate in synchronism.

Power means for shifting the mechanical coupling between its two positions comprises a ring 27 having a bearing 28 supported on shaft 13. This ring and bearing are connected to member 20 by a plurality of bolts 29. Ring 27 has a close rotating fit within a nonrotating ring 30 having an operating connection 31 to a suitable motor or other operating means for shifting coupling member 20 axially between its engaged and disengaged positions.

The fluid coupling operating to drive the output shaft in opposite directions, as shown in FIGURE 1 by way of example, includes a pair of oppositely-facing similar vaned rings 33, 34 suitably connected one to shaft 12 and one to ring member 15 forming part of driven shaft 13. Vaned ring 33 is commonly known as the impeller and ring 34 as the turbine. Since these two members are similar in construction and since either may serve as the impeller and the other as the turbine, they will be referred to frequently herein as impeller means. This coupling further includes as an essential part thereof a pair of forward drive annular impeller portions 36, 37 having a splined hub 38, 38 slidably supported on the exterior splines 18 of member 15 and on the correspondingly splined portion 18′ of shaft 12. When impeller rings 36, 37 are in their open positions, the annular ring of reverse drive impeller sections 40 are shiftable into operating position about the periphery of impeller rings 33, 34 and are cooperable therewith to drive output shaft 13 in its reverse direction. Sectors 40 are supported for generally radial movement toward and away from the axis of the coupling by linkage means which will be described presently following a more detailed description of the forward drive rings 36, 37. It will therefore be understood that the herein-disclosed coupling includes impellers 33 and 34 used selectively and optionally with either the forward drive portions 36, 37 or the reverse drive portions 40.

The forward drive impeller portions 36, 37 include semicircular rings sized to nest snugly against the exterior sides of impeller rings 33, 34. The outer peripheral rims of portions 36, 37 include oppositely facing annular portions 42 provided with radial vanes 43 having their inner edges welded or otherwise secured to rings 44 of arcuate shape in cross-section. Vanes 43 correspond in number and spacing with the radial vanes 45 forming part of the main impeller rings 33, 34 and have their adjacent outer corners rigidly secured to the annular rings 46.

Figure 3:
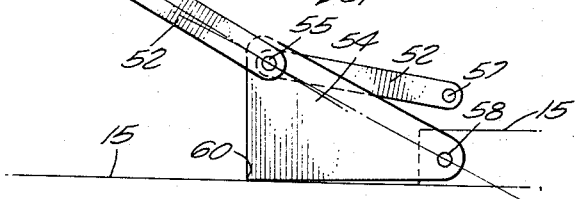
FIGURE 3 is a fragmentary view on an enlarged scale showing the toggle linkage with the parts locked in closed position.

The power operated linkage means for shifting the forward drive impeller portions 36, 37 between their respective operative and nonoperative positions will now be described with particular reference to FIGURES 1, 3 and 4. Since these linkages are identical a description of one will be understood as applying to all. Slidably supported on shafts 12 and 13 inwardly of the main housing 11 are bearing rings 48 rotating with the respective shafts and having a rotating fit within an associated nonrotating mounting ring 49. Projecting axially from the rim of ring 49 are two or more actuating rods 50 extending to a suitable motor, such as a hydraulic cylinder operable to shift rings 49 to and fro along shafts 12 and 13. The operating rings 48, 49 are connected to one end of separate toggle linkages designated generally 51 distributed circumferentially of the fluid coupling.

Each linkage 51 includes a pair of straight links 52, 53 and a generally triangular link 54 arranged in side-by-side relation and having one end of each interconnected by a common pivot pin 55. The opposite end of linkage 52 is connected to the forward impeller portions 36, 37 by pin 56, the opposite end of link 53 is connected to bearing ring 48 by pin 57, and the opposite end of link 54 is connected to shaft member 15 by pin 58. From the foregoing it will be evident that link 53 constitutes the operating connections for moving the toggle proper between its open and closed positions. When the operating rings 48, 49 are shifted inwardly to the position shown in the upper half of FIGURE 1, the toggle linkages 51 are locked in closed position wherein the axis of the common pivot pin 55 is positioned inwardly of a straight line between the axis of pivot pins 56 and 58 with corner 60 of link 54 then resting against the shaft. So long as the coupling is in use and charged with hydraulic fluid, a portion of the axial component of the centrifugal forces generated by this fluid will be effective to lock toggle linkages 51 closed with portion 60 of link 54 held firmly seated against the rotating shaft. This locking force is only a small fraction of the actual axial forces acting on pins 56 and, for this reason, only a relatively small force need be applied to rings 49 and operating links 53 to break the toggle joint. As this occurs, impeller portions 36, 37 open away from one another permitting the hydraulic fluid to escape into the interior of the coupling housing 11, thereby quickly deactivating the forward drive capability of the power train.

When the forward drive impeller portions are in their fully retracted positions shown in the lower half of FIGURE 1 it will be understood that triangular links 54 have been rotated nearly 180 degrees about pivot pins 58 from their positions as shown in the upper half of FIGURE 1 so that the forward drive vanes 43 are spaced clear of the path of the operating and supporting linkages for reverse drive impeller sections 40.

Reference will now be had to FIGURES 1 and 2 for a description of the reverse drive impeller portion which comprises a plurality of arcuate sections 40 supported by a cooperating pair of parallelogram linkages designated generally 65 and disposed one to either side of each of the impeller sections 40. Each reverse drive section 40 (FIGURE 1) is shaped and sized to be substituted for the forward drive impeller rings 42, 42 during reverse drive operation of coupling 10. To this end, each section 40 includes an outer arcuate casing 66, an inner arcuate member 67 held in assembled relation by appropriately disposed intervening reverse drive vanes 68 arranged at an acute angle to a radius of the coupling in accordance with well known fluid coupling principles.

The parallelogram supporting linkages for sections 40 each comprise a pair of parallel links 70, 71 and an operating link 72. The inner ends of parallel links 70, 71 are pivotally connected to the sides of impeller sections 40 by pivot pins 73, 74, whereas their outer ends are connected to a stationary portion 80 of the coupling housing by pivot pins 75, 76 (FIGURE 2). Referring to FIGURE 1, it is pointed out that main housing 11 for the coupling includes a central ring section 79 of channel shape in cross section having inwardly projecting annular flanges 80 in which each of pins 75, 76 is anchored. The stationary channel member 79 provides a raceway for rotary operating ring 83 having inwardly projecting bosses 84 at intervals thereabouts and to which the outer ends of the operating links 72 are connected by pivot pins 85, the opposite ends of links 72 being connected to parallelogram links 71 by pivot pins 86. Operating ring 83 has an outwardly projecting arm 89 having a pivoted connection with the piston rod of a hydraulic cylinder 90 pivoted at 91 to the interior of the housing 11 and operable as necessary to shift the parallelogram linkages 65 between their operative and nonoperative positions of reversing sections 40. Motors similar to motor 90 may be employed to shift members 31 of the mechanical coupling 24, 25 and rods 50, 50 of toggle linkages 51.

The operation of the disclosed reversible power train will be apparent from the foregoing detailed description of its principal components and their operating relationship to one another. Owing to the ease and certainty with which the described coupling may be shifted between forward and reverse drive as well as into and out of direct mechanical drive, the system is eminently suited for a wide variety of uses including the propulsion of ships by remote control from the pilot house or from the bridge. Coupling 10 is located in the drive train between the prime mover and the propeller and the controls for the several motors and for the hydraulic fluid pump may all be operated by remote control from this single control station. Coupling 10 is fully enclosed and the lower portion of the main housing serves as a reservoir 95 for the hydraulic fluid, it being understood that the fluid is withdrawn from this reservoir through conduit 96 to the inlet of the usual pump, not shown, from which the fluid is returned through conduit 97 to the interior of the impeller. In this connection it will be understood that conduit 97 opens into a stationary annular manifold 98 having a running fit and seal with the radial wall portion of shaft 12 and with its interior discharging into passages 99 formed axially of shaft 12 and opening into the interior of the impeller proper.

Let it be assumed that the pilot wishes to drive the ship forward. In this event the motor for the operating rods 50, 50 are activated to shift the forward drive impeller portions 36, 37 to the position shown in the upper half of FIGURE 1, care first being exercised to ascertain that the reverse drive impeller portions 40 are in the retracted position shown in the upper half of FIGURE 1. The hydraulic fluid pump will, of course, be in operation as will the driving prime mover. It will be understood that all parts of the impeller casing and of the vanes are as closely spaced as possible in accordance with customary practice to minimize loss of fluid from the impeller. As is well known, the supply of fluid to the inside of the rotating impeller results in the circulation of the fluid within the impeller in the clockwise direction indicated by the arrows in FIGURE 1 whereupon driven shaft 13 will gather momentum in a forward direction and rotate at a speed only slightly less than that of drive shaft 12. The fluid pressure within the impeller resulting from the described fluid rotation tends to open impeller portions 36, 37 axially away from one another. However, this opening movement cannot occur because toggle linkages 51, 51 are in closed position with center pivot pin 55 slightly below the straight line between pivots 56 and 58. Hence the centrifugal forces applied against the portions 36, 37 tend to lock the linkages more firmly in closed position and to hold corner 60 of link 54 pressed firmly against the exterior of ring member 15.

After the ship is in open water and en route on a long voyage the pilot can improved the efficiency of the drive train by abruptly slowing the speed of the prime mover in known manner and allowing the momentum of the ship and of the propeller to maintain the speed of shaft 13 substantially undiminished. By reading tachometers or other devices indicating with accuracy the speed of each of shafts 12 and 13, the pilot waits until both shafts have reached synchronous speed and then operates the motor to shift the mechanical clutch member 20 to the left as viewed in FIGURE 1 to engage teeth 24, 25 of the mechanical coupling. The hydraulic fluid pump can now be deactivated and the propeller driven directly and in synchronism with the prime mover without the small but unavoidable power loss inherent in the operation of any fluid coupling.

As soon as there is likelihood of need for abrupt change in speed or in the direction of power delivery, it is a simple matter to disengage the positive coupling 24, 25 and to deactivate fluid coupling 10 and to resume the supply of hydraulic fluid to coupling 10.

Let it now be assumed the operator wishes to reverse the drive of shaft 13. The first step is to retract actuating rod 50, 50 and ring assemblies 36, 37 away from the opposite sides of main coupling impeller members 33, 34. The slight initial movement of rods 50 suffices to place actuating links 53 of the toggle linkages 51 in tension. Only a very low order of force is required to move pivot pins 55 outwardly of their neutral position. As this occurs the hydraulic fluid escapes from around the mating edges of impeller portions 42, 42 immediately unloading the coupling and thereby further reducing the power required to move forward drive portions 36, 37 to their fully retracted nonoperative positions shown in the lower half of FIGURE 1. This operation is accomplished in a matter of a few seconds following which motor 90 is actuated to rotate operating ring 83 clockwise as viewed in FIGURE 2 thereby to pivot the reverse drive sections 40 into closed operative position relative to impeller rings 33, 34. When sectors 40 are shifted into their operative positions, straight lines passing lengthwise of links 70, 71 and through the centers of the pivot pins at their opposite ends lie parallel to and equidistantly from the dot and dash line 100 passing through point 101 at the midlength of sections 40. The resultant of the hydraulic fluid forces acting on each of sections 40 also passes through point 101 and the magnitude of this resultant hydraulic pressure is indicated by the length of arrow 102 in FIGURE 2. It will be understood that the links are so arranged that this resultant force arrow is only slightly to the left of center line 100 with the result that the relatively short arrow 103 represents the direction and magnitude of the relatively small portion of resultant force 102 acting through center 101 and tending to rotate sections 40 clockwise about the axis of the fluid coupling 10. Arrow 103 also represents the magnitude of the forces tending to lock the parallelogram linkages 65 in closed position during reverse operation of the fluid coupling. When the coupling is operating in reverse, as described, links 70, 71 and 72 are under high compression owing to the magnitude of the centrifugal forces represented by arrow 102. However, these forces are readily carried by the main housing of the coupling which is designed to support such loads.

If at any time the pilot or operator wishes to deactivate the reverse drive it is merely necessary to reverse the operation of motor 90 to rotate control ring 83 counterclockwise thereby to shift the reversing sections 40 to their retracted positions shown in the upper half of FIGURE 2. Only slight power is required for the reasons just explained and, immediately following slight opening of the sections, the hydraulic fluid within the coupling is lost into the interior of the main housing.

Referring now to the slightly modified versions of the fluid coupling illustrated in FIGURES 5 and 6, it is pointed out that the same reference characters have been employed to designate the same or similar components described above but distinguished therefrom by the addition of a prime and a double prime respectively. The showings made in FIGURES 5 and 6 are quite schematic and intended to illustrate that the displaceable portion of the forward drive may comprise a single ring portion 36' or 36" and that this portion may be located either in the upper right-hand (FIGURE 5) or in the upper left-hand quadrant (FIGURE 6). In this event, the reverse drive sections 40' and 40", respectively, are supported radially outwardly of their operating positions when retracted, and are movable radially inwardly to supplant the forward drive portions 36' and 36" respectively when used to drive the output shaft 13' or 13" in reverse direction. It will be understood that the same general type of operating linkages as described in detail above may be employed. It will therefore be appreciated from the foregoing brief description of the modifications shown in FIGURES 5 and 6 that the principles of the present invention may be practiced by fluid coupling designs of widely varying designs and types.

While the particular reversible fluid coupling device herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A reversible fluid coupling device comprising, in combination, a main housing having axially aligned drive and driven shafts equipped at their adjacent ends with cooperating impeller means arranged to be coupled together by hydraulic fluid, said impeller means including first and second separately supported annular impeller portions selectively movable between operative and nonoperative positions relative to the remainder of said impeller means, said first annular impeller portion when in operative position cooperating to rotate said driven shaft in the forward direction and second annular impeller portion when in operative position cooperating to rotate said driven shaft in the reverse direction.

2. A fluid coupling device as defined in claim 1 characterized in that said first annular impeller portion and the support therefor rotates with one of said shafts when in the operative position thereof, and in that said second annular impeller portion and the support therefor is supported nonrotatably and separately from each of said shafts.

3. A fluid coupling device as defined in claim 1 characterized in that said second annular impeller portion includes means for moving the same generally toward and away from said shafts between the operative and nonoperative positions thereof.

4. A fluid coupling device as defined in claim 3 characterized in that said means for moving said second annular impeller portion between the operative and nonoperative positions thereof includes means for holding the same against movement relative to said shafts when in said operative and nonoperative positions.

5. A fluid coupling device as defined in claim 1 characterized in the provision of power-operated toggle means for moving said first annular impeller portion between operative and nonoperative positions and for locking said impeller portion in operative position.

6. A fluid coupling device as defined in claim 5 characterized in that said first annular impeller portion includes a pair of ring sections movable axially toward and away from one another on the remote faces of said impeller means, and each of said ring sections including an associated power-operated toggle means for moving one of said ring sections between the operative and nooperative positions thereof.

7. A fluid coupling device as defined in claim 5 characterized in that said toggle means includes a plurality of similar linkages distributed circumferentially about said shafts, at least some of said linkages having three links lying parallel to one another axially of said shafts and having one end of each pivotally connected together and their opposite ends connected one to said first annular impeller portions, one to one of said shafts to rotate therewith, and one to the power operating means for said toggle means.

8. A fluid coupling device as defined in claim 7 characterized in that the power operating means for said toggle means includes ring means keyed to one shaft and shiftable axially thereof and having a pivot connection with the last mentioned one of said three links of said toggle means.

9. A fluid coupling device as defined in claim 1 characterized in that said second annular impeller portion comprises a plurality of arcuate vaned sections arranged in a ring and each including linkage means connecting the same to said main housing for movement into and out of cooperative relation with the remainder of said impeller means and effective when in operative relation to cause said driven shaft to rotate in the reverse direction, and power means connected to said linkage means and operable to move said vaned sections between the operative and nonoperative positions thereof.

10. A fluid coupling device as defined in claim 1 characterized in said second annular impeller portion comprises a plurality of arcuate vaned sections arranged about the periphery of said impeller means each provided with parallelogram linkage connection means with said main housing and so arranged that the forces acting on said vaned sections tend to force said sections into firmer end-to-end ring abutment with one another when said sections are acting to rotate said driven shaft in the reverse direction thereof.

11. A fluid coupling device as defined in claim 10 characterized in the provision of power means operatively connected to said parallelogram linkage means and effective to shift said vaned sections between the operative and nonoperative positions thereof and having an operating power capability which is fractional in comparison with the reverse power capacity of said fluid coupling device.

12. A fluid coupling device as defined in claim 10 characterized in the provision of ring means and operating connections between said ring means and said parallelogram linkage means operable upon actuation of said ring means to shift said vaned sections in unison between the operative and nonoperative positions thereof, and reversible power means connected to said ring means for rotating said ring means in either direction about the axis of said shafts.

13. A fluid coupling device as defined in claim 1 characterized in that the adjacent ends of said shafts are equipped with an axially engageable direct mechanical coupling adapted to be engaged while said first annular impeller portions are in operative position and then used in lieu of said impeller means to provide direct mechanical coupling between said shafts.

14. A fluid coupling as defined in claim 13 characterized in the provision of means for deactivating said fluid coupling upon engagement of said direct mechanical coupling and accomplished by moving said first annular impeller portion out of operative position relative to the remainder of said impeller means.

15. A fluid coupling as defined in claim 1 characterized in that the movement of either said annular impeller means into and out of the respective operative positions thereof is effective to activate and deactivate said fluid coupling device so long as hydraulic fluid is being supplied to said impeller means.

16. A fluid coupling device as defined in claim 1 characterized in that said second annular impeller portion comprises a plurality of arcuate vaned sections arranged about the periphery of said impeller means each provided with parallelogram linkage connection means with said main housing and so arranged that the hydraulic pressure forces acting against said vaned sections when in their operative position are effective to lock said vaned sections in operative position and to hold said parallelogram linkage means against reverse opening movement toward nonoperative position of the vaned sections.

17. A fluid coupling device having a main housing provided with axially aligned drive and driven shafts equipped at their adjacent ends with cooperating impeller means arranged to be coupled together by hydraulic fluid to transmit power between said shafts, the adjacent inner ends of said shafts having axially mateable positive drive means engageable with one another and effective to cause said shafts to rotate in unison when engaged, said positive drive means including a mechanical coupling member on the end of one of said shafts having an axial spline connection with said one shaft and radially-disposed positive drive means thereon mateable with complementally shaped drive means juxtaposed thereto and secured to the adjacent end of the other of said drive shafts, and means connected to said mechanical coupling member and operable to engage and disengage said positive drive means whereby said coupling device is selectively operable to transmit power by fluid coupling and by positive mechanical coupling.

18. That method of transmitting rotary power to a load from a prime mover which comprises: coupling a prime mover to a load through a combination fluid and mechanical coupling having means for employing said coupling selectively as a fluid coupling and as a direct mechanical coupling, adjusting said coupling to operate as a fluid coupling while bringing the load up to a predetermined speed, slowing the prime mover speed abruptly and slightly relative to the speed of the load until the prime mover and the load are turning at the same speed, and thereupon engaging said mechanical coupling and deactivating said fluid coupling while regulating the speed of said prime mover as desired to drive said load in synchronism with said prime mover at a desired speed.

19. A brakeless, gearless reversible fluid coupling useful in transmitting rotary power in values very substantially in excess of 3000 horsepower and requiring only a very minor fraction of its output rating to operate the reversing controls thereof under loaded operating conditions, said fluid coupling having a main housing supporting aligned shafts in closely spaced end-to-end relation and equipped with juxtaposed cooperating impeller means within said housing, said impeller means including a first annular impeller portion shiftable axially into and out of operating relation to the remainder of said impeller means and cooperating therewith to transmit power in a forward direction, said impeller means further including a second annular impeller portion sized to be substituted for said first annular impeller portion and shiftable generally radially between the operative and nonoperative positions thereof in the latter of which it is out of the path of movement of said first impeller portion, said second impeller portion being effective in cooperation with said impeller means to transmit output power in the opposite direction from the input power, and said second annular impeller portion being constructed and arranged to utilize hydraulic fluid forces within said fluid coupling to hold said second impeller portions in operative position whereby upon loss of said hydraulic fluid forces said second impeller portions are released for movement to nonoperative position.

References Cited
UNITED STATES PATENTS 2,654,223  10/1953  Wang _____ 60—54

EDGAR W. GEOGHEGAN, *Primary Examiner.*